United States Patent [19]
Stephenson

[11] 3,858,824
[45] Jan. 7, 1975

[54] DUAL ACTION SAFETY SEAT BELT RETRACTOR

[75] Inventor: Robert L. Stephenson, Sterling Heights, Mich.

[73] Assignee: Allied Chemical Corporation, New York, N.Y.

[22] Filed: Mar. 27, 1973

[21] Appl. No.: 345,380

[52] U.S. Cl. .............................. 242/107.4
[51] Int. Cl. .................. B65h 75/48, A62b 35/00
[58] Field of Search ........ 242/107.4, 107 SB, 107.2, 242/107.3, 107.5, 107.6, 107.7, 107.1, 107 R; 297/386, 388; 280/150 SB; 74/575, 576, 577 R, 577 S, 577 M

[56] References Cited
UNITED STATES PATENTS

| | | |
|---|---|---|
| 253,889 | 2/1882 | Roberts .............................. 74/577 S |
| 318,212 | 5/1885 | Shaw .................................. 74/577 S |
| 509,580 | 11/1893 | Morris ............................... 74/577 S |
| 3,226,053 | 12/1965 | Petty ................................. 242/107.4 |
| 3,294,339 | 12/1966 | Fontaine .......................... 242/107.4 |
| 3,430,891 | 3/1969 | Burleigh ........................... 242/107.4 |
| 3,632,056 | 1/1972 | Hibbard ........................... 242/107.4 |
| 3,664,600 | 5/1972 | Sargeant .......................... 242/107.4 |
| 3,722,824 | 3/1973 | Hayashi ........................... 242/107.4 |
| 3,741,496 | 6/1973 | Beller ............................... 242/107.4 |

*Primary Examiner*—Stanley N. Gilreath
*Attorney, Agent, or Firm*—Clayton F. Smith; John P. Kirby, Jr.; Jonathan Plaut

[57] ABSTRACT

A reel-type retractor for a safety belt with ratchet wheel and pawl, incorporating two different automatic inertial locking systems, each responsive to different stimuli, yet independently actuating the same pawl for locking engagement with the ratchet wheel.

15 Claims, 10 Drawing Figures

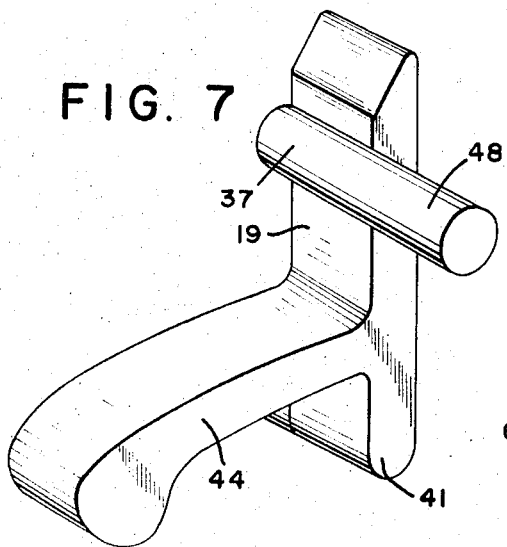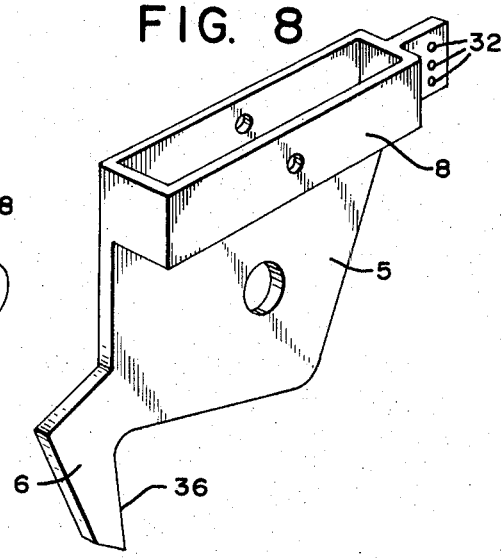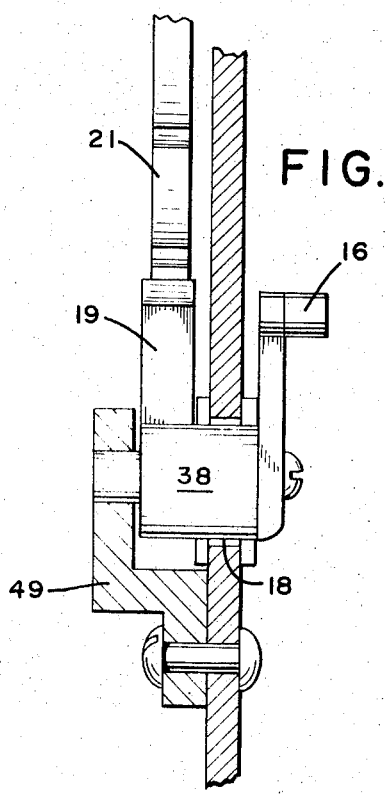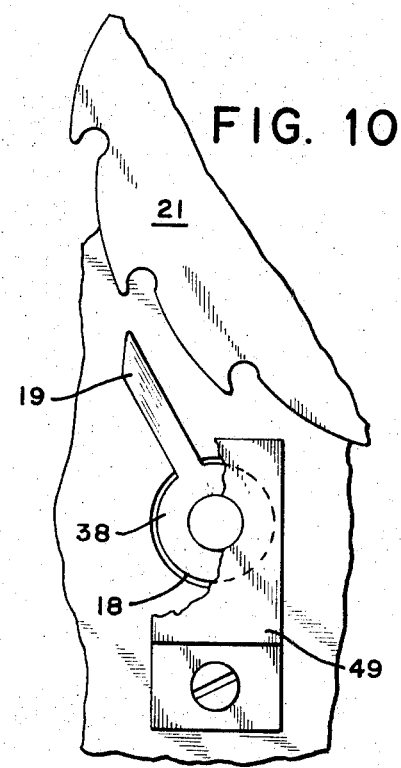

DUAL ACTION SAFETY SEAT BELT RETRACTOR

BACKGROUND OF THE INVENTION

I. Field of the Invention

This invention relates to vehicle safety seat belt retractors, and more particularly to those retractors which are normally unlocked when the belt is extended and buckled about the user but automatically lock in response to the forces which develop during the moment of impact, should a collision occur.

II. Description of the Prior Art

Emergency-locking seat belt retractors usually have a reel, biased in the rewind direction, to which a seat belt is attached for retraction. In these retractors of the prior art the reel is normally unlocked under ordinary driving conditions even though the belt is buckled about the user, thus paying out more belt or taking up the slack, in accordance with normal movements of the individual. A locking device is provided, responsive to the forces which develop at the moment of impact, thus preventing further extension of the belt and retaining the user in his or her seat.

The state of the art in this type of retraction device is exemplified by reference to U.S. Pat. Nos. 2,845,233; 3,412,952; 3,446,454; 3,467,337; 3,482,799; 3,598,336; 3,632,056 and U.S. Ser. Nos. 162,073, now U.S. Pat. No. 3,741,496, and 312,534, filed on July 13, 1971 and Dec. 6, 1972, respectively.

SUMMARY OF THE INVENTION

An automatic seat belt retracting device is disclosed having a pawl, normally out of locking engagement with a ratchet wheel fixed to a shaft on which a seat belt is wound, the shaft being biased in the rewind direction. When the pawl engages the ratchet, pay-out or extension of the belt is prevented. Two different inertial devices, responsive to different but related forces, independently act on the pawl under emergency conditions, urging it into engagement with the ratchet wheel. This dual response is particularly important first because the forces or conditions which develop at the time of an accident vary in nature. Having two independent systems increases the range of sensitivity of the retractor. For example, a car can veer off the highway, go over an embankment and roll over, without the usual accelerated extension of the belt characteristic of a collision, yet activation of the retractor in such a situation can reduce the danger of injury or loss of life. Some retractors reacting to a collision, lock, but release on the rebound before the need for restraint has passed. Secondly, it is conceivable that one system might fail, making a back-up system most advantageous.

To summarize the invention more specifically, we have, in a vehicle safety seat belt system, the combination comprising:

a. a support having a base and two walls extending therefrom;

b. a shaft journaled on the support wall adapted for connection to a seat belt, said shaft being rotatable in a winding direction and in the opposite unwind direction;

c. a biasing member connected to the support and to the shaft, urging it to rotate in its winding direction;

d. a ratchet wheel fixed to the rotatable shaft;

e. a pawl mounted pivotally on the support for engagement with the ratchet wheel, said pawl being movable between a normally unlocked position and a locked position by engagement with the ratchet to stop rotation of the shaft in its unwind direction;

f. a first normally stationary movable arm for urging the pawl into locking engagement with the ratchet wheel;

g. a second normally stationary movable arm for independently urging the pawl into locking engagement with the ratchet wheel;

h. a first normally stationary movable inertial device to which the first arm is attached, said inertial device in response to an accelerated rate of rotation of the shaft actuates the arm to urge the pawl into locking engagement with the ratchet;

i. a second inertial device movable in response to acceleration or deceleration of a vehicle to which the support is attached, which actuates the second movable arm and independently urges the pawl into locking engagement with the ratchet, whereby actuation of either inertial device independently locks the shaft, preventing extension of the seat belt attached thereto.

Objects and attendant advantages of the present invention will be readily appreciated as the same becomes better understood by reference to the following detailed description when considered in connection with the accompanying drawings.

DESCRIPTION OF THE DRAWINGS

The description refers to the accompanying drawings in which like reference characters refer to like parts throughout the several views.

FIG. 7 is another enlarged drawing of a pawl for use in a retractor such as that of FIG. 5. This pawl is gravity-biased, and carries a weighted arm for increasing the effectiveness of its gravity-bias.

FIG. 8 is a perspective drawing of the movable plate with attached arm of FIGS. 1, 2 and 5, illustrating the housing which encompasses the inertial wheel.

FIG. 9 is a perspective view in elevation of a variation of the pawl of FIGS. 1 and 2, the support wall being shown in cross-section for clarity. The single pawl is on the inner surface of the support wall, with the extension of the pawl journaled in the wall and extending to the outside surface for actuation by the first and second arm.

FIG. 10 is a break-away partial view of the pawl of FIG. 9 as seen from the inner surface of the support wall. Its relationship with the ratchet wheel is shown.

DESCRIPTION OF THE PREFERRED EMBODIMENT

Figure 1:
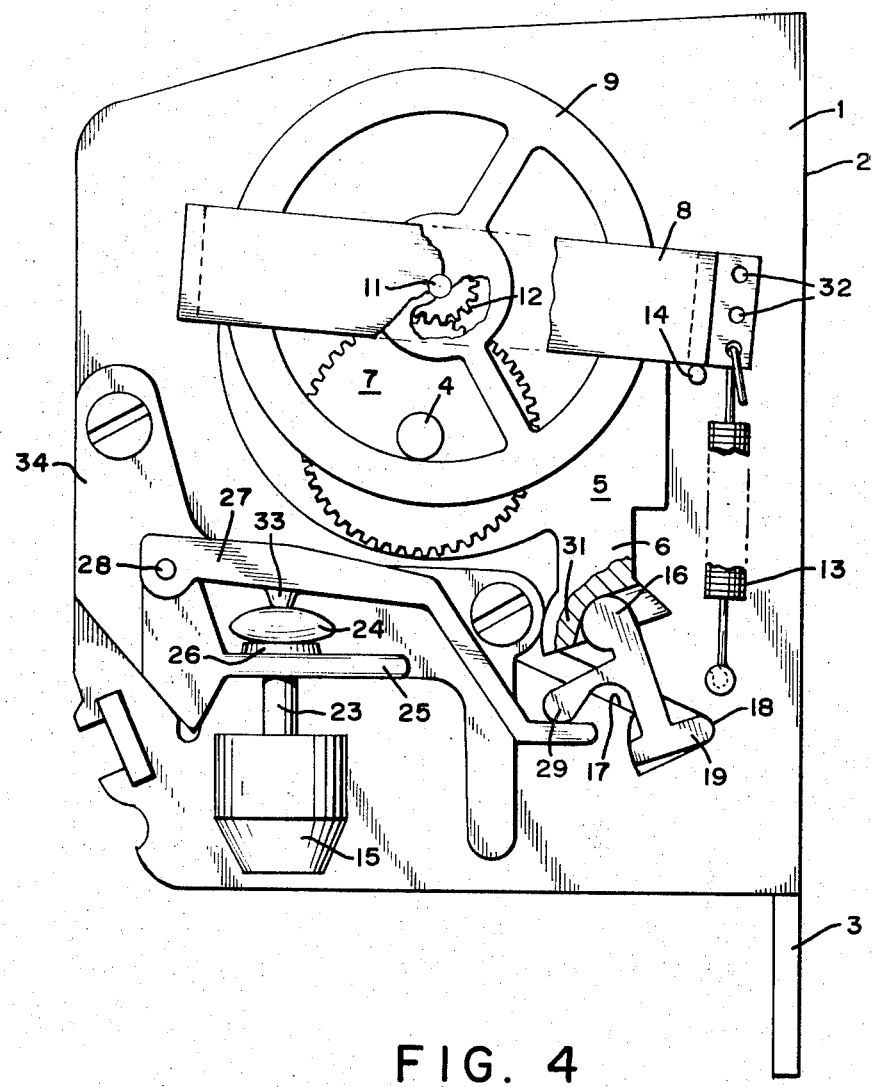
FIG. 1 is a perspective break-away view in elevation of a seat belt retractor, illustrating a preferred embodiment of the invention. Two different inertial devices are shown, attached to an outside support wall of the retractor. Both are positioned to independently actuate an extension of the pawl which is pivoted in and extends through the support wall.
Figure 2:
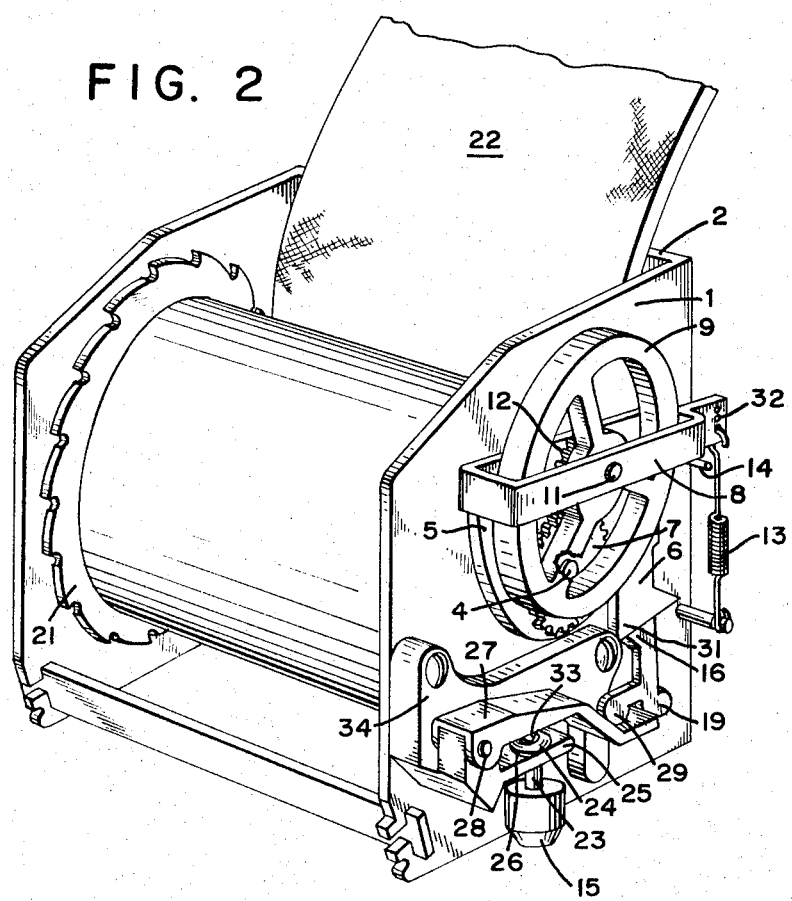
FIG. 2 is a perspective drawing of the same embodiment to better illustrate its general appearance and the relationship of the inertial devices to the balance of the retractor.

Referring now to the preferred retractor assembly of FIGS. 1 and 2, numeral 1 is a support wall extending from base 2 having a tongue 3 for connection to a vehicle. Shaft 4, journaled in support wall 1 for rotation in either direction passes through rotatable plate 5 with attached arm 6, and terminates in spur gear 7 which is fixed to the shaft. Rotatable plate 5 may include a rigid housing 8 encompassing an inertia wheel 9 which is rotatable on spindle 11 journaled in the housing. Whether the inertial wheel revolves on a fixed axle, or is fixed to spindles journaled in the housing is not critical. Neither is the housing itself critical. It would be quite satisfactory to arrange inertial wheel 9 for rotation on a spindle projecting perpendicularly from the outer surface of rotatable plate 5, but a housing is preferred for rigidity, support and additional strength. Inertial wheel 9 carries a pinion gear 12 concentrically fixed as a hub. This inertial wheel 9 is so disposed on the rotatable plate 5, that pinion gear 12 meshes with spur gear 7, hence when shaft 4 is rotated in one direction, the inertial wheel 9 rotates in the opposite direction.

As has been noted, plate 5 is rotatable about shaft 4. It is biased by spring 3 against pin-stop 14. Arm 6 attached to the rotatable plate 5 extends downwardly to actuate extending member 16, which is a part of the pawl pivotally arranged between the two support walls. Slotted opening 17 in the support wall permits the insertion of the pawl 19 to be extended between the support walls at the time the retractor is being assembled. Here it may pivot at point 18 between positions of unlocking and locking engagement with a ratchet wheel 21, fixed to the shaft for rotation between the support walls. In this embodiment, there may be one ratchet wheel adjacent to either one support wall or the other, or there may be two ratchet wheels, forming a flanged reel for the seat belt 22 wound on the shaft. In FIG. 2, one ratchet wheel is shown, adjacent to the inner surface of the support wall opposite that carrying the inertial devices.

Figure 3:
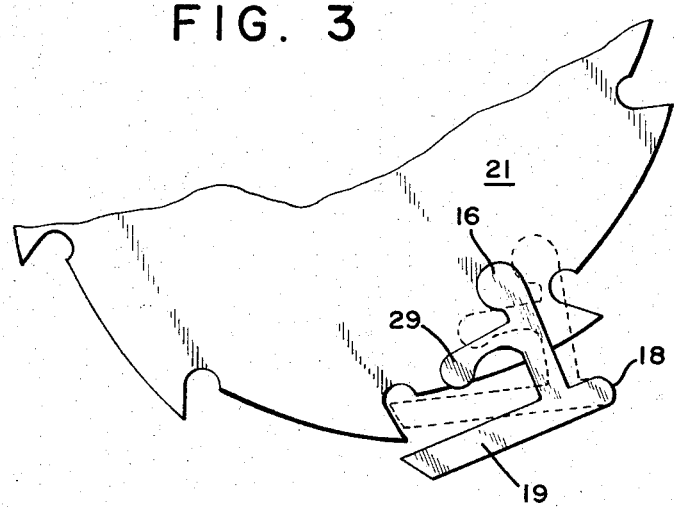
FIG. 3 is a partial plan view, illustrating the manner in which the pawl, which is hidden in FIGS. 1 and 2, pivots from an unlocked position to a locked position with the ratchet wheel as the extension of the pawl is actuated.

FIG. 3 illustrates the position of the pawl when out of engagement with the ratchet wheel 21, and pivoting at point 18. It is shown in phantom when pivoted into engagement with the ratchet wheel.

It can be seen in FIGS. 1 and 2, when the rotatable plate is in its normal stationary position against pin-stop 14, urged to that position by biasing spring 13, that movable arm 6 permits the pawl to remain out of engagement with ratchet wheel 21. Preferably, the pawl is biased by gravity to its non-engaged position with respect to the ratchet wheel 21, but it may also be spring-biased to this position, if desired, decreasing its sensitivity.

When the belt 22 is normally extended as when buckled over an individual's lap or chest, or as a result of the normal movement of the individual in the vehicle, the shaft to which the webbing is attached and about which it is wound, rotates. The spur gear 7 attached to this shaft drives the enmeshed pinion gear 12 which is attached to the inertial wheel 9, thus causing it to rotate in the opposite direction, preferably at a greater angular velocity than that of the spur gear.

The spring bias 13, however, retains the rotatable plate 5 and the arm 6 attached thereto in its normal stationary position. If, on the other hand, the belt moves at a highly accelerated rate, as would happen if a collision caused the belted passenger to lurch forward, the inertial wheel is slow to respond because of its inertia, and the spur gear acts against the attached pinion gear 12 in a direction opposite to that applied by spring bias 13. This force, acting against the pinion gear 12 which is attached to the movable plate causes the rotatable plate 5 to rotate about the shaft 4 within allowable limits, causing arm 6 to act on extended member 16 of the pawl 19 urging the pawl into locking engagement with the ratchet wheel 21, thus permitting no further extension of the seat belt 22.

For example, when the belt 22 (FIG. 2) is withdrawn from retractor 2, it causes shaft 4 and spur gear 7 to rotate in a counterclockwise direction, as viewed in FIGS. 1 and 2. Rotation of spur gear 7 in a counterclockwise direction causes pinion gear 12 to rotate in a clockwise direction, that is, in a direction opposite to spur gear 7. If the rotation of spur gear 7 is accelerated to a highly accelerated rate, the inertia of inertial wheel 9 causes pinion gear 12 to lag in rotation. As a result, pinion gear 12, spindle 11 and plate 5 move to the left as shown in FIG. 1 with reference to spur gear 7 and shaft 4, that is, counterclockwise around spur gear 7 and shaft 4. Pinion gear 12, spindle 11, inertial wheel 9, plate 5 and housing 8 all move together because they are connected to one another. Since housing 8 is a part of plate 5, housing 8 also moves counterclockwise around spur gear 7, within allowable limits. As a result, the right side of housing 8, as shown in FIG. 1, moves upward against the bias of spring 13. This movement of plate 5 about spur gear 7 and shaft 4 in a counterclockwise direction causes arm 6 to act on extended member 16 which urges the pawl 19 into locking engagement with the ratchet wheel 21.

The sensitivity of this inertial device to accelerated motion of the belt and therefore of the shaft on which it is wound, can be pre-selected in several different ways, thus the retractor may be adjusted toward increased sensitivity as applicable to slow moving vehicles by increasing the diameter and/or the mass associated with the inertial wheel 9; by decreasing the tension applied by the spring bias 13, or by increasing the effective ratio of the effective diameter of the driving gear to the effective diameter of the driven pinion gear. Normally, this ratio would fall within the range of 15:1 to 10:1, with a ratio of between about 2:1 to 3:1 being especially preferred for automotive seat belt retractors.

Obviously, the sensitivity can be reduced as would be appropriate for airplane seat belt retractors by making one or more of these modifications in the opposite direction. This inertial device is positive acting since it does not depend on friction surfaces at the point of criticality. It differs from most retractors of this type in that the pawl is not biased to engage the ratchet, but rather to its disengaged position. It therefore is not susceptible to failure by the inadvertent breakage of a spring. Even breakage of the biasing spring 13 attached to movable plate 5 could not cause the retractor to fail.

The second inertial device acting directly on pawl 19 is of the pendulum type. Pendulum 15 consists of a weight suspended from a rigid rod 23 topped with a button-shaped disc 24. The rod passes through an opening in support plate 25, said opening having a diameter sufficient to permit the pendulum to swing without restraint through an angle of at least about 30°, preferably 40° or more. The opening, however, has a diameter appreciably less than the disc so that the disc rests on the support plate 25, covering the opening and supporting the pendulum 15. In the preferred embodiment shown, a raised collar 26 surrounds the opening and the disc rests on the perimeter of this raised collar. Movable arm 27 pivots at point 28, said pivotpoint being attached by means of supporting structure 34 to the support wall 1. The arm 27 rests on the disc and extends to actuate the extended portion of pawl 19 at point 29. When this arm 27 is in its normal position, it allows the pawl 19 to rest in its unlocked position with respect to the ratchet wheel 21. If, however, the vehicle to which the retractor is attached is suddenly accelerated or decelerated as by hard braking, or as a result of the vehicle being involved in a collision, the inertia of the pendulum will cause it to swing in the direction of the point of impact, whether it be at the front or rear of the vehicle, or at either side. The disc is therefore caused to rock upwardly on the support plate 25, or the collar 26, and thereby raises arm 27 sufficiently for it to actuate the extension of the pawl 19 and therefore the pawl itself into locking engagement with ratchet wheel 21. Rotation of the shaft is instantly halted, and the passenger wearing the belt restrained.

This inertial device as with the first, may be fabricated or adjusted to give any degree of sensitivity desired. Consider, for example, the driver who falls asleep, and without appreciable change in acceleration, veers off the road and rolls over on an embankment. Vigorous extension of the belt might not occur, but if a comparatively heavy pendulum is chosen, the retractor will lock as the pendulum tends to maintain its vertical position. To differentiate between locking due to roll over, and undesirable locking on a steep hill, it is only necessary to adjust the clearance of the arm with respect to the pawl, so that response occurs only when the angle assumed by the pendulum is greater than would be encountered on an inclined roadway. If it is desired to eliminate response of the inertial device to roll over, and restrict it to forces generated by a collision, it is only necessary to lighten the pendulum weight to a point where normal tilting is insufficient to activate the pawl, but the intense forces developed as a result of a collision are easily sufficient.

Figure 4:
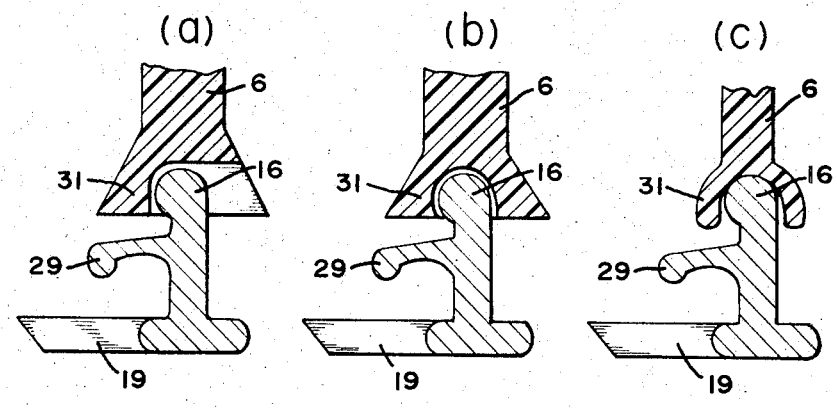
FIG. 4 presents cross-sectional views of three different possible arrangements whereby the first arm attached to the first inertial device of FIGS. 1 and 3 may relate to the extension of the pawl for actuation.

It will be noted in the drawing that arm 6 of the first inertial device ends in a contact member 31 which can urge the pawl into locking engagement but being open in one end, does not bring it back. Disengagement depends on the application of gravity (or spring bias if chosen) to the pawl. With this arrangement, neither device has any effect on the other. Another method of lessening the sensitivity of response to pendulum 15, however, would be to provide contact surfaces in the arm's contact member 31 on both sides of said member with respect to pawl extension 16. Both inertial devices would act independently as before, but biasing spring 13 would add its bias to that of the pawl in the unlocked direction, and it would also reduce the sensitivity of the pendulum since to actuate the pawl it would have to overcome the bias of spring 13. This is shown in FIG. 4 where illustration (a) represents the situation of the preferred embodiment of FIG. 1 and 2. Movement of arm contact member 31 to the right can act on extended pawl member 16, but not if it moves to the left. Similarly, if the pawl rocks to the right, it exerts no pressure on arm contact member 31 since it is open on the right side.

Illustrations (b) and (c) of FIG. 4 have contact members which surround pawl extension 16, therefore movement of the contact member to the right urges the pawl into engagement with the ratchet wheel as in FIG. 3. Movement of the contact member to the left which would result from spring bias 13, would disengage the pawl from the ratchet wheel. Such disengagement by spring 13 is not necessary, however, as the pull of gravity would disengage the pawl in any case. If the pawl is moved into locking position by actuation of the second inertial device at point 29, it can be seen that in the variation of FIG. 4(b) and 4(c), the pawl would move contact arm 31 to the right, in opposition to its biasing force thus requiring the application of greater force by the second, pendulum-actuated inertial device, thereby reducing its sensitivity. The sensitivity of the first inertial device can itself be increased or decreased by varying the tension of spring 13, by selecting the desired opening 32 for attaching the free end of spring 13. If the arm's contacting member 31 is fabricated to enclose pawl extension 16, then adjusting the tension of spring 13 would serve to affect the sensitivity of both inertial devices in the manner explained.

Figure 5:
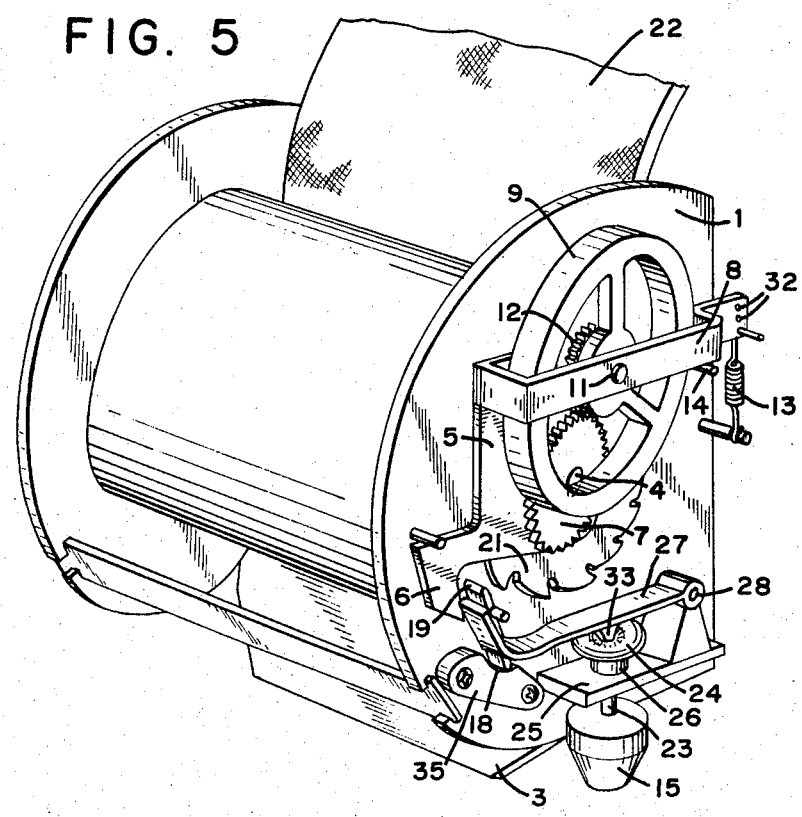
FIG. 5 is a perspective drawing of a variation of the preferred embodiment of the invention wherein the pawl and the ratchet wheel with which it engages are both mounted adjacent to the outside surface of the support wall, and the arms which actuate the pawl make sliding contact with the pawl by presenting cam surfaces thereto. Both inertial devices are shown in their normal stationary position, and the pawl is therefore in an unlatched position with respect to the ratchet wheel.

As a further refinement in the preferred embodiments of FIGS. 1, 2 and 5, a nodule 33 extends downwardly from arm 27 to rest in a corresponding centrally located depression in the upper surface of disc 24.

FIG. 2 illustrates a retractor having a single ratchet wheel 21 adjacent to the inner surface of the support wall opposite that supporting the inertial devices. This ratchet wheel could as well be adjacent to the support wall supporting the inertial devices, it could be adjacent to the support wall (FIG. 5) or there could be two ratchet wheels, one at each support wall, or even adjacent to each other.

FIGS. 9 and 10 illustrate a variation in the form of pawl that can be used when the ratchet wheel is adjacent to the inner surface of the support wall carrying the inertial devices. In this situation pawl 19 has a cylindrical extension 38 journaled in the support wall, with extending member 16 positioned for actuation by arm 6 and contact member 31 of FIGS. 1, 2 and 4. The cylindrical extension has a comparatively large diameter for strength, and is shown as further supported by bracket 49. This single pawl offers the advantage of lightness and low inertia for rapid response.

Figure 6:
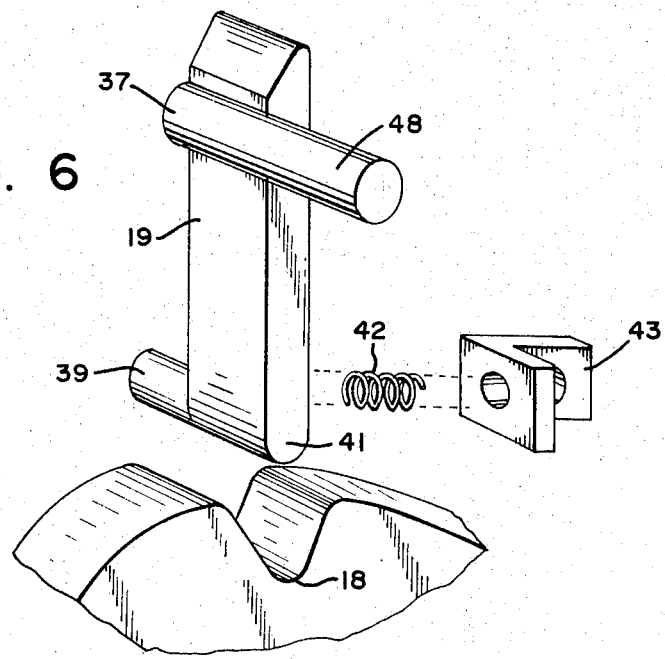
FIG. 6 is an enlarged drawing of one design for the pawl of the retractor of FIG. 5, together with a section of the block in which it pivots. Preferably this pawl is gravity-biased, but this figure illustrates one method of adding spring bias to the pawl to urge it towards its unlocked position.

FIG. 5 illustrates a variation of the preferred embodiment wherein the ratchet wheel 21 is fixed to the rotatable shaft 4, adjacent to the outside surface of the support wall, between the support wall and the movable plate 5. It is separated from the support wall and the movable plate by a washer so that its rotation does not have any appreciable drag on the movable plate. In this variation, the ratchet wheel is somewhat smaller in diameter than that of FIGS. 1 and 2, and the pawl 19 which engages it is a small light member preferably pivoting in a block 35 for strength. An enlarged view of a suitable pawl is shown in FIG. 6. The arm 6 attached to the movable plate rotates downwardly to urge the pawl into engagement. In this variation, the surface 36 of FIG. 8 is a camming surface which acts against point 37 of the pawl of FIGS. 6 and 7 to urge it into engagement with the ratchet wheel 21. The downward action of arm 6 is effected by the action of the accelerated rotation of the shaft and spur gear 7 on the inertial wheel 9 as previously explained in the case of FIGS. 1 and 2.

Pendulum 15 also behaves as previously described to lift arm 27 when subjected to forces of acceleration or deceleration. The inner surface of the upwardly extending arm 27 also has a camming action on pawl 19, independently exerted on cam follower 48, projecting from the pawl. This contacting or camming action urges the pawl into engagement with the ratchet wheel, independent of the action of arm 6 of the first inertial device.

FIG. 6 also includes cylindrical stub 39 aligned with pivoting edge 41, which extends into a corresponding cylindrical opening in the support wall for limited rotation. FIG. 6 also optionally include spring bias 42 acting between fixed bracket 43 and pivotable pawl 19 to bias the pawl into its unlocked position with the ratchet wheel, supplementing the pull of gravity as the biasing force.

FIG. 7 illustrates another variation in the pawl of FIGS. 1 and 2, wherein weighted projection 44 extends outwardly in a direction to increase the biasing effect of gravity to urge the pawl in its normal position out of engagement with the ratchet wheel 21. These pawls even to a greater extent than that of FIG. 9, have the advantage of being light, and having little inertia; so that they respond with great rapidity when urged by the inertial devices into engagement with the ratchet wheel.

The invention has been described in an illustrative manner. It is to be understood that the terminilogy which has been used is intended to be in the nature of words of description rather than of limitation.

Many modifications or variations of the present invention are possible in light of the above teachings. It is therefore to be understood that within the scope of the appended claims, the invention may be practiced otherwise than as specifically described.

I claim:

1. In a vehicle safety seat belt system, the combination comprising:
   a. a support having a base and two walls extending therefrom;
   b. a shaft journaled on the support and adapted for connection to a seat belt, said shaft being rotatable in a winding direction and in the opposite unwind direction, said shaft having a first gear on one end thereof;
   c. a biasing member connected to the support and to the shaft, urging it to rotate in its winding direction;
   d. a ratchet wheel fixed to the rotatable shaft;
   e. a pawl mounted pivotally on the support for engagement with the ratchet wheel, said pawl being movable between a normally unlocked position and a locked position for engagement with the ratchet wheel to stop rotation of the shaft in its unwind direction;
   f. a first normally stationary arm which is movable upon actuation for urging the pawl into locking engagement with the ratchet wheel and which has a contact portion unconnected to but adapted to contact said pawl for actuating said pawl, thereby permitting said pawl to also pivot separate from said first arm;
   g. a second normally stationary arm which is movable upon actuation for urging the pawl independent of said first arm into locking engagement with the ratchet wheel and which has a contact portion unconnected to but adapted to contact said pawl for actuating said pawl, thereby permitting said pawl to also pivot separate from said second arm;
   h. a first normally stationary inertial device to which the first arm is attached, said inertial device comprising a plate rotatable within allowable limits about said shaft, said late supporting an inertial wheel and a second gear, said second gear adapted to engage said first gear, whereby in response to rotation of the shaft at acceleration exceeding a predetermined rate, displacement of the plate occurs, causing the arm to urge the pawl into locking engagement with the ratchet;
   i. a second inertial device, movable in response to acceleration or deceleration of the vehicle to which the support is attached, which actuates the second movable arm and independently urges the pawl into locking engagement with the ratchet wheel, whereby actuation of either inertial device independently locks the shaft, preventing extension of the seat belt attached thereto.

2. The combination of claim 1 wherein the ratchet wheel is fixed to a portion of the shaft extending beyond one journal in one wall, for rotation outside of the support adjacent to the wall, and wherein the pawl is mounted pivotally on this wall, outside of the support, for engagement with the ratchet wheel.

3. The combination of claim 1 wherein a pivot block is fixedly positioned on the outside wall, said block having a groove in its upper surface perpendicular to the wall, and the pawl with a pivoting edge is positioned with its pivoting edge resting in the groove to allow the pawl to pivot therein through an angle from its normally disengaged position to its engaged position with the ratchet wheel.

4. The combination of claim 3 wherein the pawl has a cylindrical stub, aligned wih the pivoting edge, which extends into a corresponding cylindrical opening in the support wall for limited rotation therein as the pawl is moved in and out of engagement with the ratchet wheel.

5. In a vehicle safety seat belt system, the combination comprising:
   a. a support having a base and two support walls extending therefrom;
   b. a shaft having two ends journaled on the support and adapted for connection to a seat belt, said shaft being rotatable in a winding direction and in the opposite unwind direction, said shaft having a first gear on one end thereof;

c. a biasing member connected to the support and to the shaft, urging it to rotate in a winding direction;

d. a ratchet wheel fixed to a rotatable shaft;

e. a pawl mounted pivotally on the support for engagement with the ratchet wheel, said pawl being movable between a normally unlocked position and a locked position for engagement with the ratchet wheel to stop rotation of the shaft in its unwind direction, a portion of said pawl, extending through one support wall, angled for motion substantially parallel to the outside surface of the wall, as the pawl is moved between its locked and unlocked positions, said extending portion of said pawl having a first actuation member and a second actuation member;

f. a first normally stationary inertial device biased to its normally stationary position and having a first arm for contacting said first actuation member of said extending portion of the pawl extending through the support wall, said first arm unconnected to but adapted to contact said first actuation member of said pawl, thereby permitting said pawl to also pivot separate from said first arm, said inertial device comprising a plate, said plate being rotatable to a limited degree about the shaft, and retained adjacent to the support wall by a first gear fixed to one end of the shaft, contiguous with the outer surface of the plate; said plate additionally supporting a rotatable inertial wheel carrying a second gear concentrically fixed thereto for engagement with the first gear, whereby in response to rotation of the shaft at acceleration exceeding a predetermined rate, angular displacement of the plate against its bias occurs, causing the arm to urge the pawl into engagement with the ratchet wheel;

g. a second inertial device movable in response to acceleration or deceleration of the vehicle to which the support is attached, which actuates a second movable arm for contacting said second actuation member of said extending portion of said pawl and urging the pawl independent of said first arm into locking engagement with the ratchet wheel, said second arm unconnected to but adapted to contact said second actuation member of said pawl, thereby permitting said pawl to also pivot separate from said second arm, whereby actuation of either inertial device independently locks the shaft, preventing extension of the seat belt attached thereto.

6. The combination of claim 5 wherein the inertial wheel with attached gear rotates on a spindle normal to the surface of the rotatable plate and fixed thereto.

7. The combination of claim 5 wherein the rotatable plate includes a rigid housing extending about the inertial wheel and its attached gear, said housing having parallel walls with opposing openings in each wall into which a shaft for the wheel is journaled and supported.

8. The combination of claim 5 wherein the first inertial device is supported on the outside wall by the shaft, for limited rotation thereon, and the second inertial device is supported on the same outside wall below the first inertial device, with the arm of the first inertial device extending downwardly to actuate the pawl and with the arm of the second inertial device extending upwardly to independently actuate the same pawl.

9. The combination of claim 5 wherein at least one ratchet wheel fixed to the shaft is disposed between the two support walls and adjacent to one of the walls, with the inertial devices supported on the outside of one of the walls, and with the pawl extending pivotally between both walls for engagement with the ratchet wheel; said pawl having a projecting member extending through the wall supporting the inertial devices for contact with the arms of said devices, whereby the pawl is actuated into locking engagement with the ratchet wheel when the projecting member is urged by an arm of either inertial device independent of the other.

10. The combination of claim 5 wherein the pawl is mounted for engaging a ratchet wheel adjacent to the inner surface of the support wall, which wall carries the inertial devices on its outer surface, the pawl being fixed to a rotatable shaft journaled in the wall, said shaft having a projecting member adjacent to the outer surface of the wall for contact with, and actuation by, the arms of the inertial devices supported on said outer surface of the support wall, for urging the pawl into engagement with the ratchet wheel.

11. In a vehicle safety seat belt system, the combination comprising:

a. a support having a base and two walls extending therefrom;

b. a shaft journaled on the support and adapted for connection to a seat belt, said shaft being rotatable in a winding direction and in an opposite unwind direction, said shaft having a first gear to one end thereof;

c. a biasing member connected to the support and to the shaft, urging it to rotate in its winding direction;

d. a ratchet wheel fixed to the rotatable shaft;

e. a pawl mounted pivotally in the support walls for engagement with the ratchet wheel, said pawl being movable between a normally unlocked position and a locked position by engagement with the ratchet wheel to stop rotation of the shaft in its unwind direction, a portion of said pawl, extending through one support wall, angled for motion substantially parallel to the outside surface of the wall, as the pawl moves beteween its locked and unlocked positions, said extending portion of said pawl having a first actuation member and a second actuation member;

f. a first normally stationary arm which is movable upon actuation and which has a contact portion for actuating said first actuation member of said pawl for urging the pawl into locking engagement with the ratchet wheel, said first arm unconnected to but adapted to contact said first actuation member of said pawl, thereby permitting said pawl to also pivot separate from said first arm;

g. a second normally stationary arm which is movable upon actuation and which has a contact portion actuating said second actuation member of said pawl for urging the pawl independent of said first arm into locking engagement with the ratchet wheel, said second arm unconnected to but adapted to contact said second actuation member of said pawl, thereby permitting said pawl to also pivot separate from said second arm;

h. a first normally stationary inertial device to which the first arm is fixedly attached, said inertial device comprising a plate rotatable within allowable limits about said shaft, said plate supporting an inertial wheel and a second gear, said second gear adapted to engage said first gear, whereby, in response to rotation of the shaft with acceleration exceeding a predetermined rate, displacement of the plate occurs, causing the arm to urge the pawl into locking engagement with the ratchet wheel;

i. a second inertial device, movable in response to acceleration or deceleration of a vehicle to which the support is attached, which actuates the second movable arm and independently urges the pawl into locking engagement with the ratchet, said second inertial device comprising a pendulum, free to swing in all directions, said pendulum being suspended on a rigid rod which passes upwardly from the pendulum through an opening in a horizontal plate fixed to the outer support wall, said opening having sufficient diameter so as not to appreciably inhibit the motion of the pendulum; said rigid rod topped with and perpendicular to a disc, having a diameter greater than the opening for the shaft; said disc resting on the upper surface of the horizontal plate to support the rod and attached pendulum; said movable arm of this second inertial device lying horizontally above the disc with one end hinged for motion in an arc parallel to the outer surface of the support wall, said hinge being fixed to the support wall; the other end of the arm in its normal position is adjacent to the pawl in its unlocked position whereby any movement of the pendulum resulting from acceleration or deceleration of a vehicle to which the support is attached, raises the disc by rocking it to a point near its periphery, thereby raising the arm above, and independently moving the pawl into locking engagement with the ratchet wheel.

12. The combination of claim 11 in which the disc has a centrally located depression corresponding to a protruding nodule beneath the second arm, and the opening in the horizontal plate has a raised collar extending upwardly from the plate, with the disc resting on the circular edge of this collar rather than directly on the surface of the horizontal plate, said opening and surrounding collar being sized to permit the pendulum to swing through an arc of at least about 40°.

13. The combination of claim 11 wherein the movable plate of the first inertial device, and the components of the second inertial device with the exception of the pendulum are fabricated of polymeric material for lightness and quick response.

14. In a vehicle safety seat belt system, the combination comprising:
   a. a support having a base and two support walls extending therefrom;
   b. a shaft journaled on the support and adapted for connection to a seat belt, said shaft being rotatable in a winding direction and in the opposite unwind direction;
   c. a biasing member connected to the support and to the shaft, urging it to rotate in its winding direction;
   d. a ratchet wheel fixed to the rotatable shaft;
   e. a pawl mounted pivotally in the support walls for engagement with the ratchet wheel, said pawl being movable between a normally unlocked position and a locked position for engagement with the ratchet wheel to stop rotation of the shaft in its unwind direction a portion of said pawl, extending through one support wall, angled for motion substantially paralel to the outside surface of the wall, as the pawl moves between its locked and unlocked positions, said extending portion having a first actuation member and a second actuation member;
   f. a first normally stationary inertial device biased to its normally stationary position and having a first arm for contacting said first actuation member of said extending portion of the pawl extending through the support wall, said first arm unconnected to but adapted to contact said first actuation member of said pawl, thereby permitting said pawl to also pivot separate from said first arm, said inertial device comprising a plate, said plate being rotatable to a limited degree about the shaft, and retained adjacent to the support wall by a first gear fixed to one end of the shaft, contiguous with the outer surface of the plate; said plate additionally supporting a rotatable inertial wheel carrying a second gear concentrically fixed thereto for engagement with the first gear, whereby in response to rotation of the shaft with acceleration exceeding a predetermined rate, angular displacement of the plate against the bias occurs, causing the first arm to urge the pawl into engagement with the ratchet wheel;
   g. a second inertial device, movable in response to acceleration or deceleration of a vehicle to which the support is attached, which actuates a second movable arm for contacting said second actuation member of said extending portion of said pawl and urging the pawl independent of said first arm into locking engagement with the ratchet wheel, said second arm unconnected to but adapted to contact said second actuation member of said pawl, thereby permitting said pawl to also pivot separate from said second arm, whereby actuation of either inertial device independently locks the shaft, preventing extension of the seat belt attached thereto, said second inertial device comprising a pendulum, free to swing in all directions, said pendulum being suspended on a rigid rod which passes upwardly from the pendulum through an opening in a horizontal plate fixed to the outer support wall, said opening having sufficient diameter so as not to inhibit the motion of the pendulum; said rigid rod topped with, and perpendicular to a disc, having a diameter greater than the opening for the shaft; said disc resting on the upper surface of the horizontal plate to support the rod and attached pendulum; said movable arm of this second inertial device lying horizontally above the disc with one end hinged for motion in an arc parallel to the outer surface of the support wall, said hinge being fixed to the support wall; the other end of the arm is in its normal position is adjacent to the pawl in its disengaged position, whereby any movement of the pendulum resulting from acceleration or deceleration of a vehicle to which the support is attached, raises the disc by rocking it to a point on its periphery, thereby raising the arm above, and independently moving the pawl into locking engagement with the ratchet wheel.

15. In a vehicle safety seat belt system, the combination comprising:
   a. a support having a base and two support walls extending therefrom;
   b. a shaft journaled on the support and adapted for connection to a seat belt, said shaft being rotatable in a winding direction and in the opposite unwind direction;

c. a biasing member connected to the support and to the shaft, urging it to rotate in its winding direction;

d. a ratchet wheel fixed to the rotatable shaft adjacent to the outer surface of the support wall;

e. a pawl mounted pivotally on the support walls for engagement with the ratchet wheel, said pawl being movable between a normally unlocked position and a locked position by engagement with the ratchet wheel, to stop rotation of the shaft in its unwind direction;

f. a first normally stationary inertial device biased to its normally stationary position and having a first arm, said first arm having a contact portion unconnected to but adapted to contact said pawl for actuating said pawl, thereby permitting said pawl to also pivot separate from said first arm, aid inertial device comprising a plate, said plate being rotatable to a limited degree about the shaft, and retained adjacent to the ratchet wheel by a first gear fixed to the end of the shaft, contiguous with the outer surface of the plate; said plate additionally supporting a rotatable inertial wheel carrying a second gear concentrically fixed thereto for engagement with the first gear, whereby in response to rotation of the shaft at acceleration exceeding a predetermined rate, angular displacement of the plate against the bias occurs, causing the first arm to urge the pawl into engagement with the ratchet wheel;

g. a second inertial device, movable in response to acceleration or deceleration of a vehicle to which the support is attached, which actuates a second movable arm, said second arm having a contact portion for contacting said pawl and urging the pawl independent of said first arm into locking engagement with the ratchet wheel, said second arm being unconnected to but adapted to contact said pawl, thereby permitting said pawl to also pivot separate from said second arm, said second inertial device comprising a pendulum, free to swing in all directions, said pendulum being suspended on a rigid rod which passes upwardly from the pendulum through an opening in a horizontal plate fixed to the outer support wall, said opening having sufficient diameter so as not to inhibit the motion of the pendulum; said rigid rod topped with, and perpendicular to a disc, having a diameter greater than the opening for the shaft; said disc resting on the upper surface of the horizontal plate to support the rod and attached pendulum; said movable arm of this second inertial device lying horizontally above the disc and having a pivot point at one end for motion of said movable arm in an arc parallel to the outer surface of the support wall, said pivot point being fixed to the support wall; the other end of the arm in its normal position being adjacent to the pawl in its disengaged position, whereby any movement of the pendulum resulting from acceleration or deceleration of a vehicle to which the support is attached, raises the disc by rocking it to a point on its periphery, thereby raising the arm above, and independently moving the pawl into locking engagement with the ratchet wheel.

* * * * *

UNITED STATES PATENT OFFICE
CERTIFICATE OF CORRECTION

PATENT NO. : 3,858,824
DATED : January 7, 1975
INVENTOR(S) : Robert L. Stephenson It is certified that error appears in the above-identified patent and that said Letters Patent are hereby corrected as shown below:

Column 3, line 45: "3" should read -- 13 --.

Column 4, line 65: "15:1" should read -- 1.5:1 --.

Column 8, line 24: "late" should read -- plate --.

Column 11, line 65: "paralel" should read -- parallel --.

Column 12, line 51: "is" should be deleted.

Column 13, line 16: "aid" should read -- said --.

Signed and Sealed this second Day of September 1975

[SEAL]

Attest:

RUTH C. MASON
Attesting Officer

C. MARSHALL DANN
Commissioner of Patents and Trademarks